(12) United States Patent  
Chou (10) Patent No.: US 7,979,948 B2
(45) Date of Patent: Jul. 19, 2011

(54) SOFT WIPER (75) Inventor: Tung-Jung Chou, Taipei (TW)

(73) Assignee: Chun-Ting Huang, Yunlin Hsien (TW)

( * ) Notice: Subject to any disclaimer, the term of this patent is extended or adjusted under 35 U.S.C. 154(b) by 707 days.

(21) Appl. No.: 11/921,512

(22) PCT Filed: Aug. 10, 2005

(86) PCT No.: PCT/CN2005/001228
§ 371 (c)(1),
(2), (4) Date: Jun. 11, 2008

(87) PCT Pub. No.: WO2006/119679
PCT Pub. Date: Nov. 16, 2006

(65) Prior Publication Data
US 2008/0313843 A1 Dec. 25, 2008

(30) Foreign Application Priority Data

May 11, 2005 (CN) ...................... 2005 2 0018489 U (51) Int. Cl.
*B60S 1/38* (2006.01)
*B60S 1/40* (2006.01)
(52) U.S. Cl. .............. 15/250.201; 15/250.32; 15/250.43

(58) Field of Classification Search ............. 15/250.201, 15/250.361, 250.43, 250.44, 250.32, 250.451–250.454
See application file for complete search history.

(56) References Cited

U.S. PATENT DOCUMENTS

| 2,955,313 | A | * | 10/1960 | Anderson | .................. 15/250.47 |
| 3,041,654 | A | * | 7/1962 | Anderson | .................. 15/250.451 |
| 6,588,048 | B2 | * | 7/2003 | Ohyama | .................... 15/250.43 |
| 2004/0098821 | A1 | * | 5/2004 | Kraemer et al. | .......... 15/250.201 |

* cited by examiner

*Primary Examiner* — Gary Graham
(74) *Attorney, Agent, or Firm* — Tim Tingkang Xia; Morris, Manning & Martin, LLP (57) ABSTRACT

A soft wiper includes a pivotal connector, a pair of wiper strips, a pair of first resilient pieces, a pair of second resilient pieces, a pair of protecting covers, and a pair of end caps. The pivotal connector is pivotally connected to a wiper arm. The pivotal connector is configured to connect with the first resilient pieces, thereby forming a passage between the first resilient pieces for slidably receiving the wiper strips and the second resilient pieces therein. Each of the first and second resilient pieces is extended individually and independently. Accordingly, this provides the soft wiper with an appropriate softness, resiliency, and strength for support the wiper strips and lowering the jerk problem while the soft wiper wiping on a car windscreen.

10 Claims, 8 Drawing Sheets

SOFT WIPER

BACKGROUND OF THE INVENTION

1. Field of the Invention

The present invention relates to a windscreen wiper, and more particularly, to a soft wiper that makes use of two pairs of built-in type resilient pieces to provide the softness, resiliency, and strength which required by the wiper strip for closely contacting with the windscreen surface.

2. Description of the Prior Art

Figure 1:
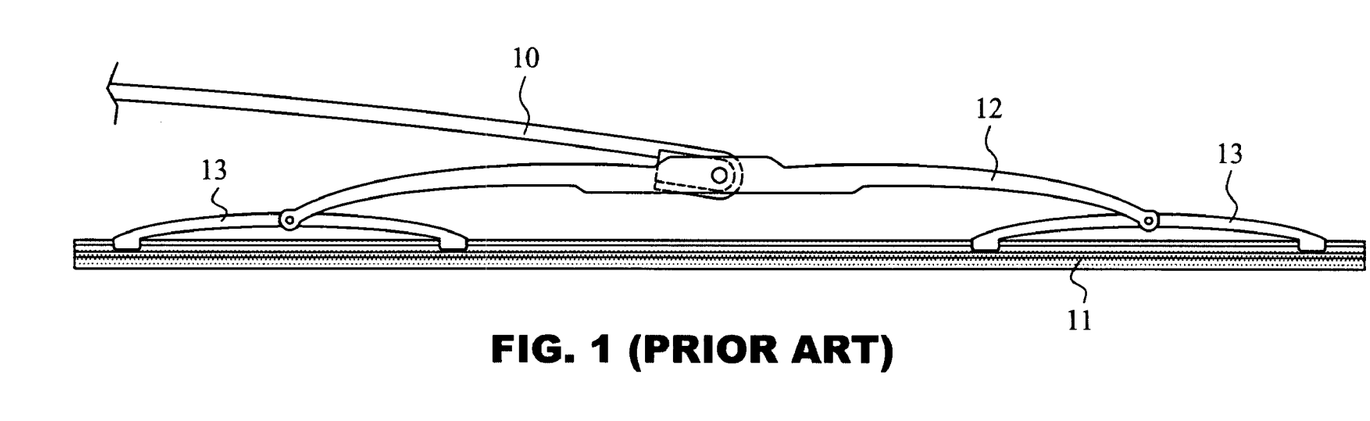
FIG. 1 is a schematic structural diagram of the multi-pivot windshield wiper of the prior art.

FIG. 1 is a schematic structural diagram of the multi-pivot windscreen wiper of the prior art. As shown in FIG. 1, the windscreen wiper structure of the prior art makes use of a wiper arm (10) to generate reciprocating wiping motion.

Such a windscreen wiper in the prior art, includes a primary carrier (12) to drive a plurality of auxiliary carriers (13) thereby to uniformly transfer and distribute a biasing force yielding from the spring which loaded in the wiper arm (10) and acting on the car windscreen. One can refer to some improvements of this kind of conventional wipers disclosed by the U.S. patents such as U.S. Pat. No. 5,493,750, U.S. Pat. No. 5,598,603, or U.S. Pat. No. 6,754,933 etc.

A significant problem is existed in the windscreen wiper with the auxiliary carriers while used in a frigid-zone where the rain and ice may freeze between the carriers and affects the motion of the wiper. Therefore, there is a further design of the wiper appeared as shown in FIG. 2.

Figure 2:
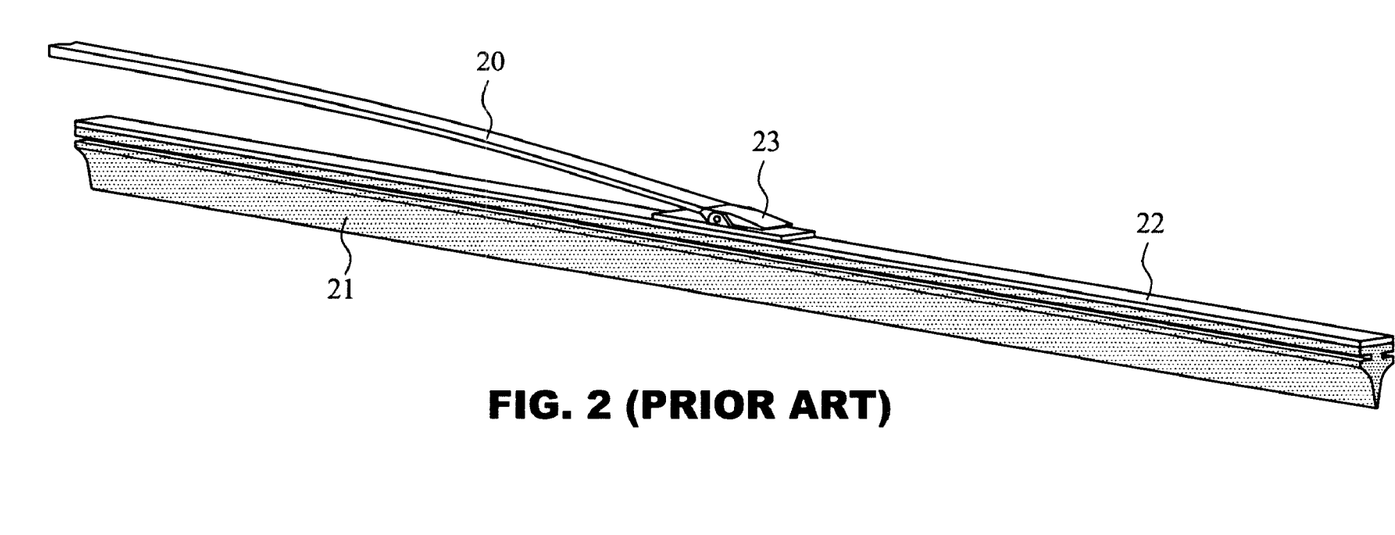
FIG. 2 is a schematic structural diagram of the non-pivot windshield wiper of the prior art.

As shown in FIG. 2, another conventional wiper which is driven by a wiper arm (20) comprises a wiper strip (21) fixed to an intermediate portion of a resilient piece (22) by a pivotal connector (23).

The pivotal connector (23) connected with the wiper arm (20) and used to transmit the biasing force from the wiper arm (20) through the resilient piece (22) thereby acting on the windscreen for wiping the rain.

The conventional windscreen wiper may have another problem that the distal end thereof may be dragged by a friction force while wiping on the windscreen, this friction force shall act on the pivotal connector (23) and cause the whole wipe blade distortion and vibration, the longer the wiper blade, the larger the problem is.

As a result, some unpleasant jerks may occur while the friction force acting on both ends of the wiper. There are many alternative designs of this windscreen wiper, and one can refer to U.S. Pat. No. 6,687,948 and U.S. Pat. No. 6,799,348.

Figure 3:
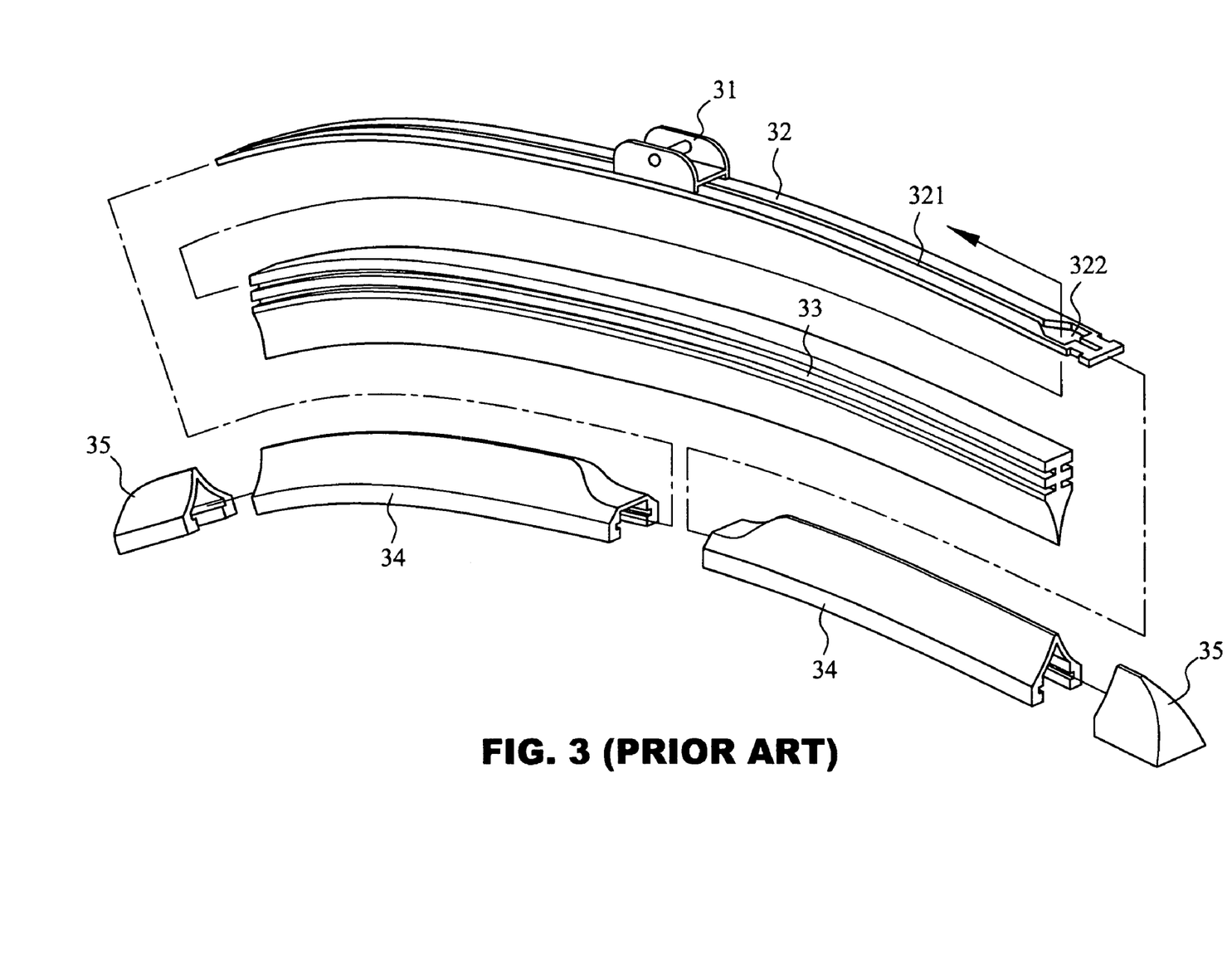
FIG. 3 is a structural exploded view of the non-pivot windshield wiper of the prior art.

As shown in FIG. 3, another conventional wiper includes a pivotal connector (31), a resilient piece (32), a wiper strip (33), a pair of protecting covers (34), and a pair of end caps (35) wherein the outer intermediate portion of the resilient piece (32) secured to the inner edge of the protecting covers (34).

The resilient piece (32) is formed with a closed groove (321) positioned along the central line thereof and a passage extending through the pivotal connector (31). One end of the closed groove (321) further formed with a wider opening (322) that allows the wiper strip (33) to get in and pass therethrough.

To assemble such a wiper, one should insert the wiper strip (33) through the hole (322) and the passage thereby to advance to another end of the groove (321). Finally, the one should put on the end caps (35) to secure at the both ends of the wiper.

Figure 4:
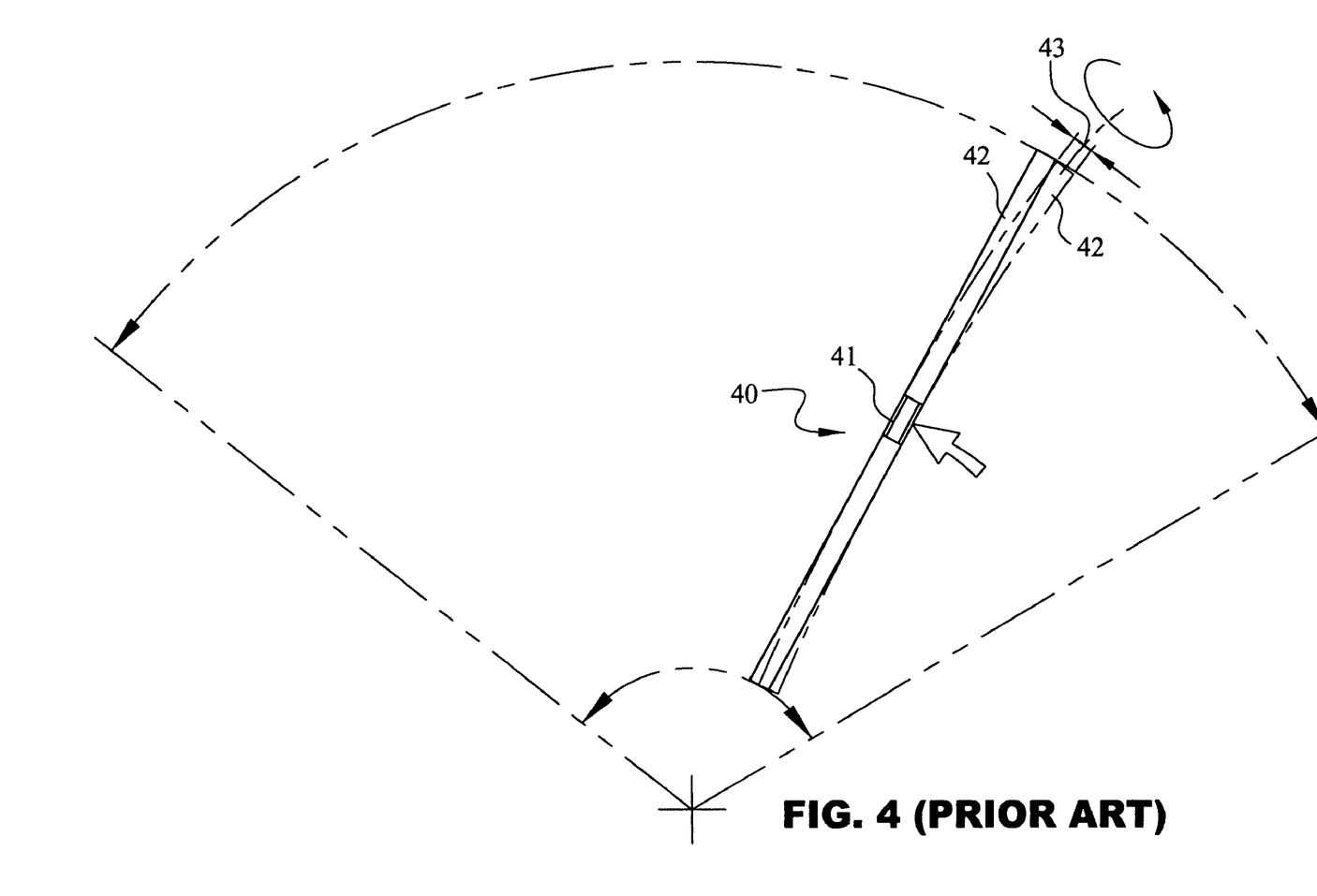
FIG. 4 is a schematic diagram showing the fact that the distal end of a wiper is resisted causes end deflection of the prior art.
Figure 5:
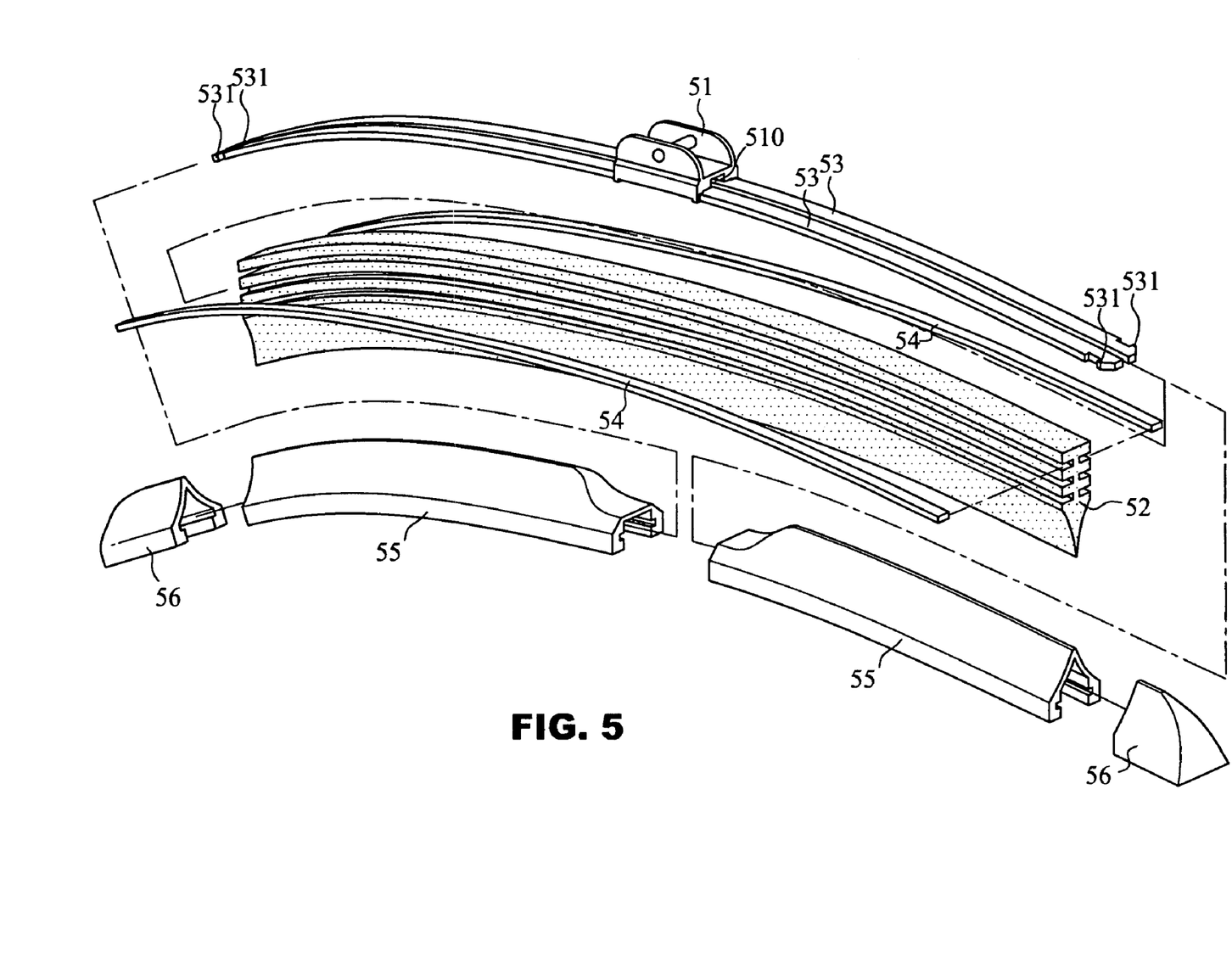
FIG. 5 is a structural exploded view of the windshield wiper of the invention.

FIG. 4 is a schematic diagram showing the distal end of a traditional wiper deformed in a non-smoothly wiping on a windscreen. As shown in FIG. 4, since the conventional wiper (40) driven by a pivotal connector (41) to drive the resilient piece (42), the wiper is dragged by the friction force from the screen this would yield a torque acting on the whole sectional-width (43) thereof.

The torque causes the deformation at the distal end of the wiper strip (33). Further, once the friction force drags the wiper unevenly, the wiper would jerk and fail to clean the rain clearly. It would become worse if the wiper is relative longer but lacks sufficient strength to lower the jerk.

SUMMARY OF THE INVENTION

In light of the above-mentioned disadvantages of the prior arts, the invention provides a soft wiper that eliminates the necessary of using the plurality of auxiliary carriers.

The invention makes use of the variation of the number, the position, and the connecting relationship of the components to provide a soft wiper with good softness, resilient force, and strength required by a windshield wiper.

The soft wiper embodiment of the present invention may include a pivotal connector, a pair of wiper strips, a pair of first resilient pieces, a pair of second resilient pieces, a pair of protecting covers, and a pair of end caps. Among them, the pivotal connector is pivotally connecting to a wiper arm to undertake reciprocating motion.

The bottom side of the pivotal connector connects to the first resilient piece to allow both ends of the first resilient pieces freely suspend.

The inner edge of the lower side of the protecting cover is adapted to connect the outer intermediate portion of the first resilient piece. Further, a passage is formed between the pair of first resilient pieces and the internal portion of the pivotal connector.

The passage allows the wiper strip and the pair of second resilient pieces slidably connect therein. While the wiper strip and the pair of second resilient pieces are inserted, the end caps shall secure to the ends of the soft wiper.

The soft wiper embodiment of the present invention allows all of the end portions of the resilient pieces deforming individually and independently, that provides appropriate softness, resiliency, and strength that is capable of resolving the jerk problem at the distal ends in case the wiper is insufficient in strength and relatively long in length.

The accomplishment of this and other objectives and the range of suitability of the application of the invention will become apparent from the following description and its accompanying drawings of which:

DETAILED DESCRIPTION OF THE PREFERRED EMBODIMENT

As shown in FIGS. 5 to 9, the soft wiper embodiment of the invention includes a pivotal connector (51), a wiper strip (52), a pair of first resilient pieces (53), a pair of second resilient pieces (54), a pair of protecting covers (55), and a pair of end caps (56). Among them, the pivotal connector (51) is pivoted with the wiper arm of a car thereby to carry the soft wiper wiping the windscreen reciprocally.

Figure 6:
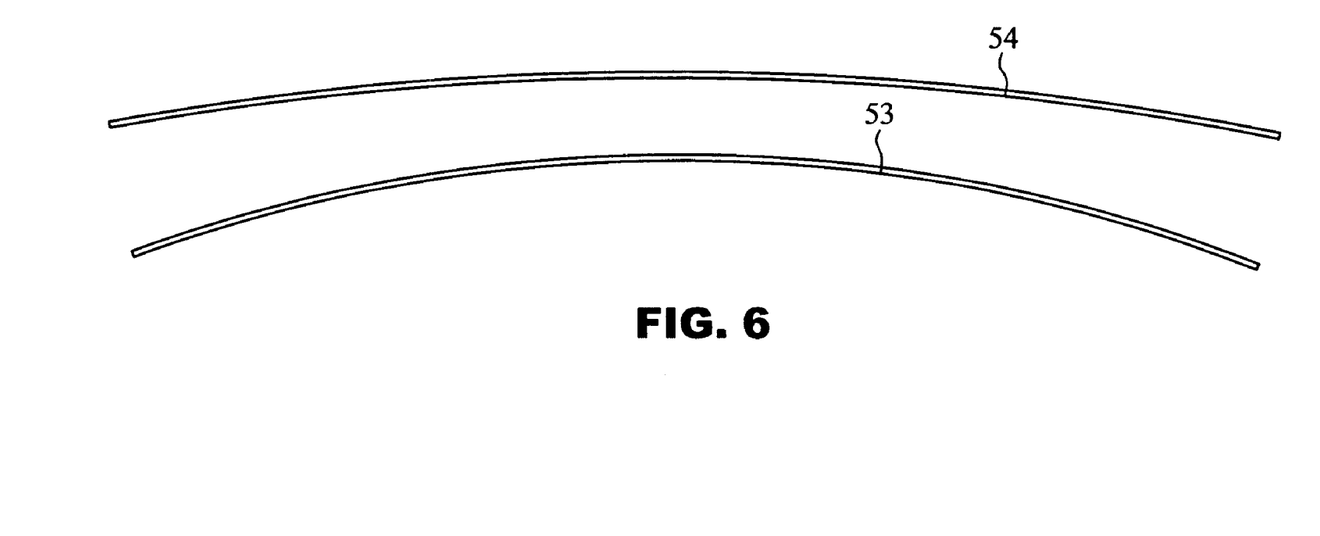
FIG. 6 is a schematic diagram of the resilient pieces of the invention.

FIG. 6 is a schematic diagram showing the resilient pieces of the invention. As shown in FIG. 6, the first resilient pieces (53) and the second resilient pieces (54) may be made of the Shape Memory Alloy (SMA) and preformed with a curve adapted to fit to the surface of the windscreen.

Besides, the curvature or bent radius of the second resilient piece (54) may be formed in a shape which slightly greater or smaller than that of the first resilient piece (53) to generate a prestressing force to eliminate the unpleasant jerk in use.

Figure 7:
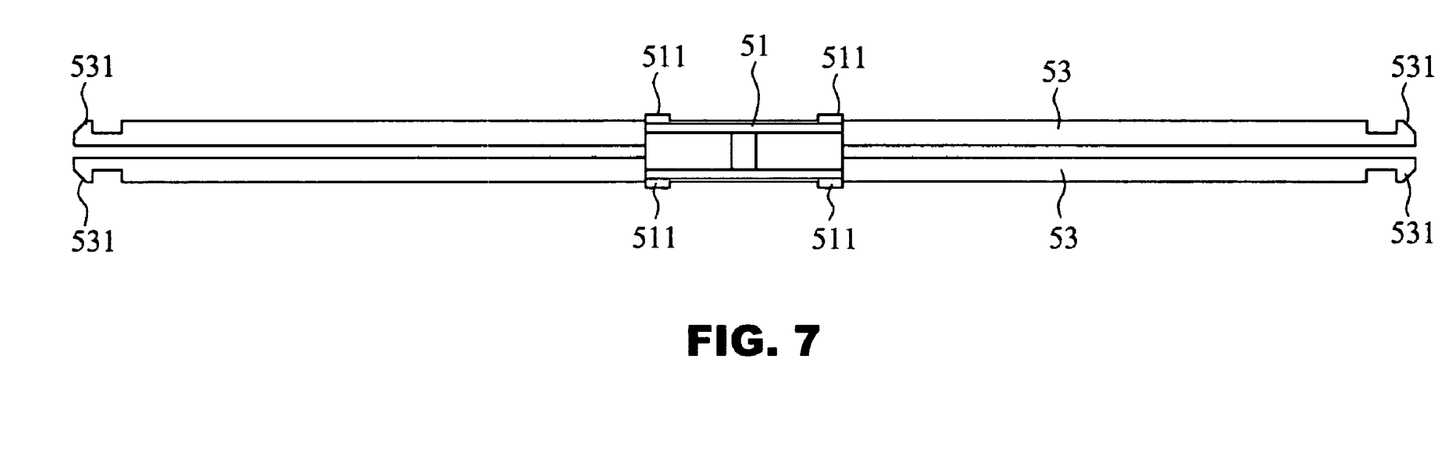
FIG. 7 is a schematic plan view of the combination of the first resilient piece and the pivotal connector of the invention.

As shown in FIG. 7, the first resilient pieces (53) are connected to the lower portion of the pivotal connector (51). It will also be appreciated that to provide a plurality of protruded claw portions (511) to hold the first resilient pieces (53), and left the both ends of the first resilient pieces (53) freely suspend.

Figure 8:
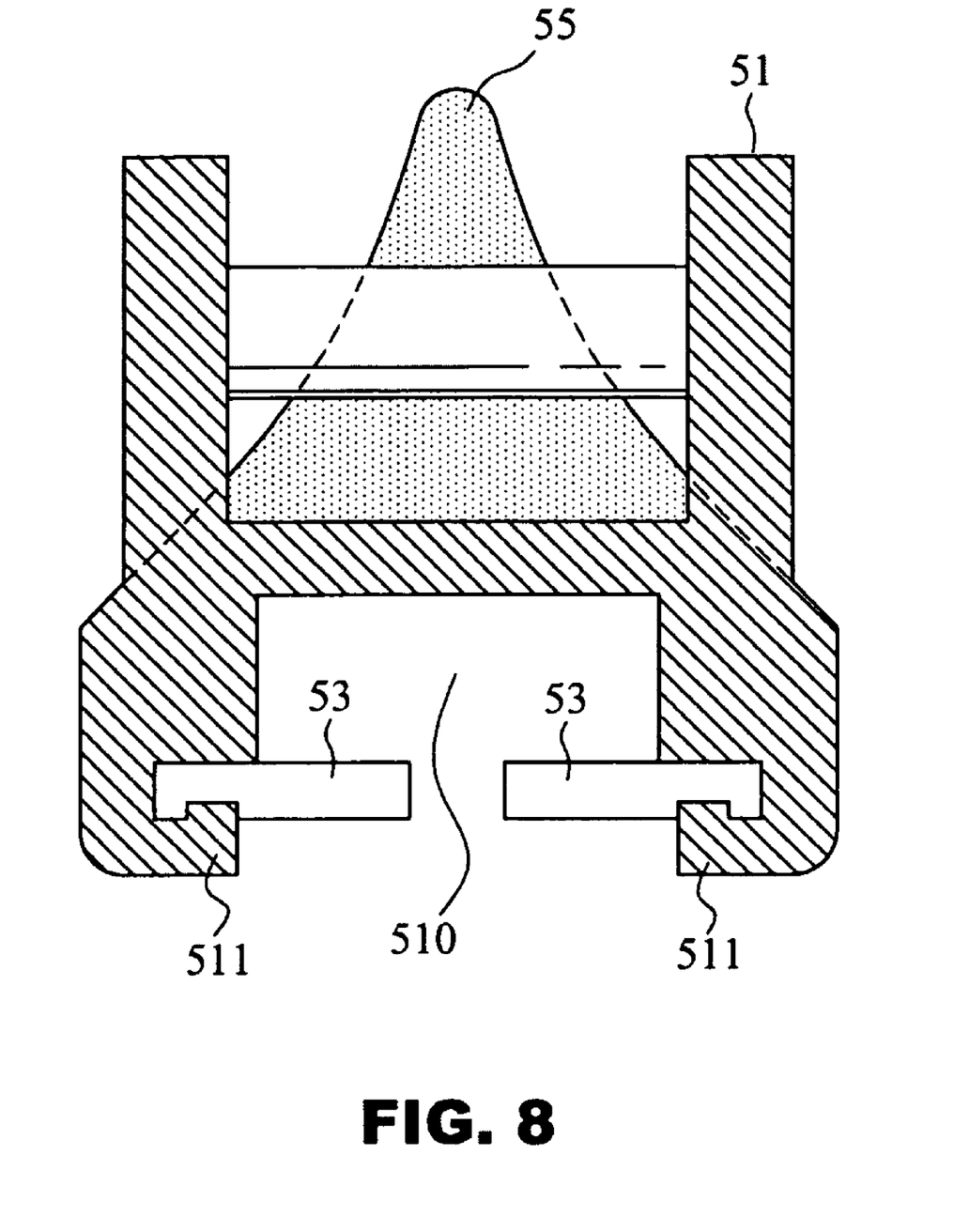
FIG. 8 is a schematic cross-sectional view of the combination of the first resilient piece and the pivotal connector of the invention.

Referring to FIG. 8, the protecting covers (55) may be made of a soft material is formed into a configuration having a ramp for guiding the air flow to reduce fluttering against the wind while the car being run in a high speed.

It should also be appreciated that a glue or adhesive material is applied between the protecting covers (55) and the first resilient pieces (53), and a passage (510) is formed between the protecting covers (55) and the first resilient pieces (53).

Figure 9:
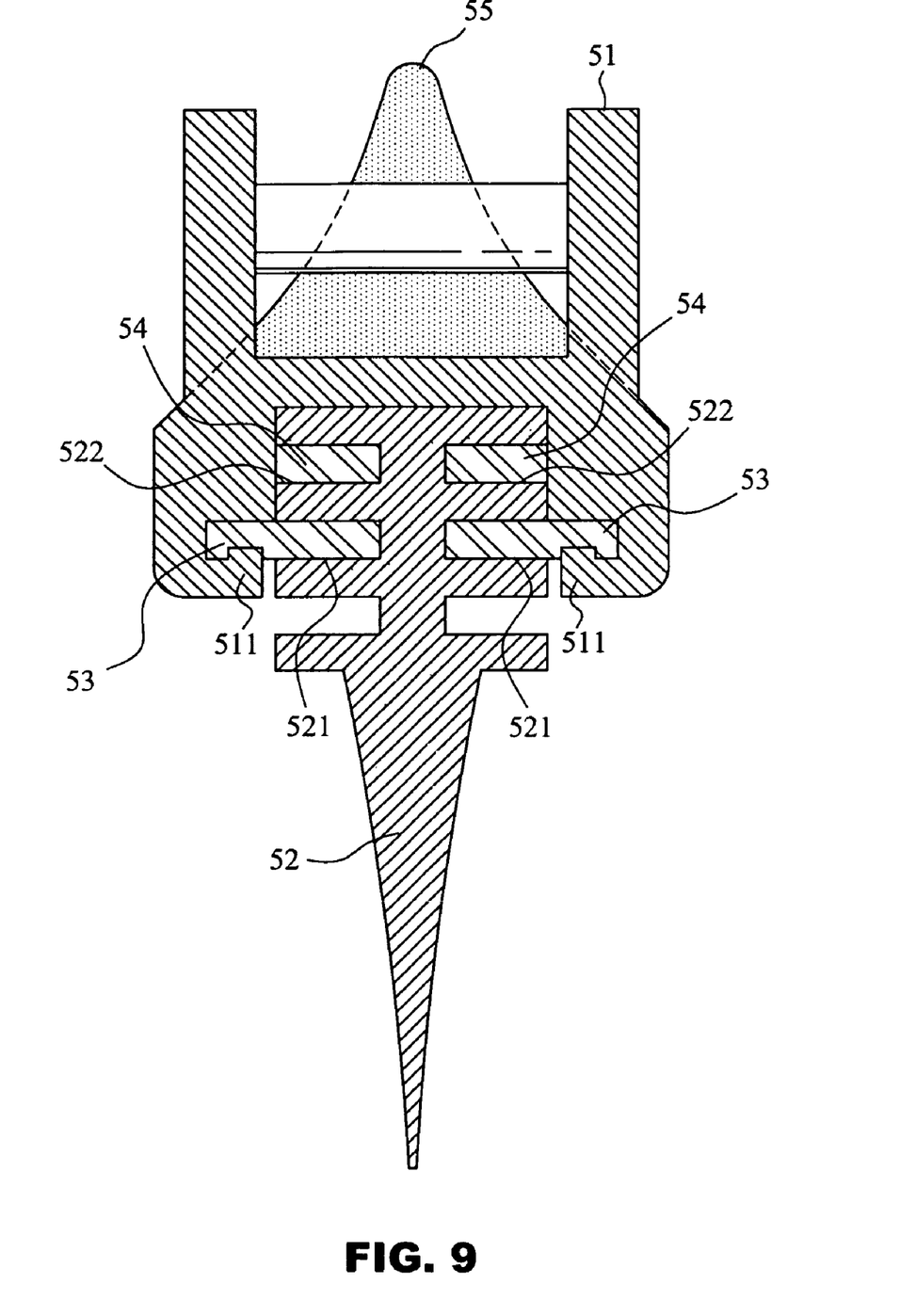
FIG. 9 is a cross-sectional view of an embodiment of the wiper of the invention.

FIG. 9 is a cross-sectional view showing an embodiment of the wiper of the invention. The wiper strip (52) being provided a plurality of grooves on both sides each having a first groove (521) for inserting the first resilient piece (53) and a second groove (522) for inserting the second resilient piece (54).

To assemble such a soft wiper of the present invention, one can slidably insert the wiper strip (52) and the second resilient piece (54) into the passage (510) and the protecting covers (55) with the guiding of first resilient pieces (53). When the inserting of the wiper strip (52) and the second resilient pieces (54) completed, further to connect the end caps (56) to the ends of the soft wiper, to prevent the wiper strip (52) and the second resilient pieces (54) depart from the end of the soft wiper.

To facilitate such an assembly, the first resilient piece (53) may be formed with a hook-like portion (531) at the distal ends thereof, so as to allow the end caps (56) be secured by the hook-like portion (531).

Figure 10:
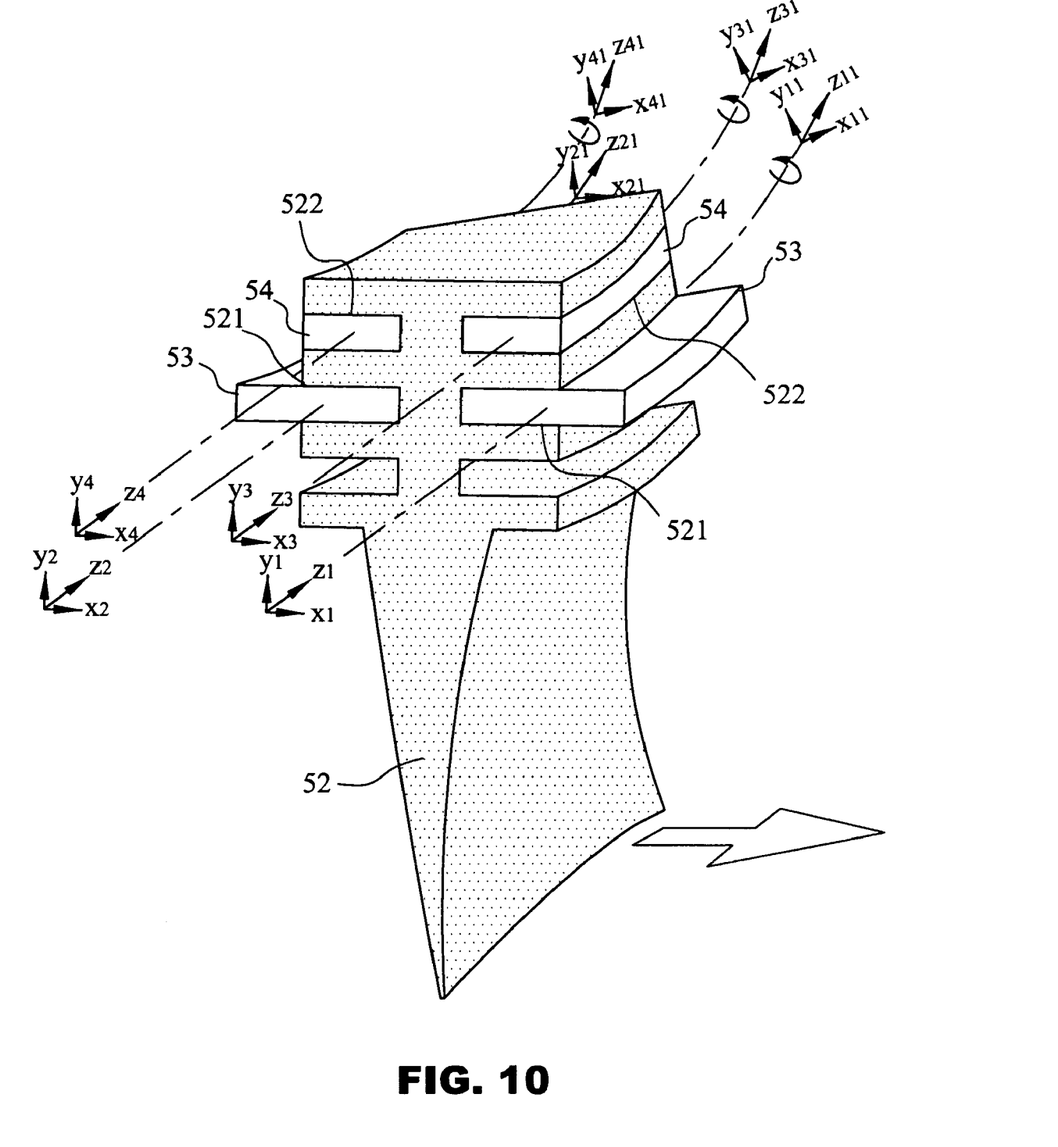
FIG. 10 is a schematic diagram of the invention showing the individually independent torsion after the resilient piece is subjected to an external force.

FIG. 10 is a schematic diagram showing the resilient pieces (53) and (54) deformed individually and independently while wiper strip (52) wiping and dragging by the friction force on the windscreen.

Therefore, as being deformed individually and independently, the coordinate system $(x_1,y_1,z_1)$, $(x_2,y_2,z_2)$, $(x_3,y_3,z_3)$, and $(x_4,y_4,z_4)$ each will be twisted individually and independently and generate a new end coordinate system $(x_{11},y_{11},z_{11})$, $(x_{21},y_{21},z_{21})$, $(x_{31},y_{31},z_{31})$, and $(x_{41},y_{41},z_{41})$.

Here is a conclusion that the soft wiper embodiment of the invention shall have a relative high softness, resiliency, and strength thereby to lower the jerk problem what happened to the conventional wiper as shown in FIG. 4.

It will become apparent to those people skilled in the art that various modifications and variations which can be made to the mechanism of the invention without departing from the scope or spirit of the invention. In view of the foregoing description, it is intended that all the modifications and variation fall within the scope of the following appended claims and their equivalents.

What is claimed is:

1. A soft wiper, comprising:
a pivotal connector, pivotally connected with a wiper arm so as to be driven by the wiper arm;
a pair of first resilient pieces, connected to the pivotal connector and having a passage formed between the pair of first resilient pieces and the pivotal connector, the passage being extended through the pivotal connector;
a pair of protecting covers, each protecting cover having an inner edge connected with one of the first resilient pieces on an outer intermediate portions of the first resilient pieces;
a wiper strip, inserted through the passage and formed with a plurality of grooves on both sides thereof;
a pair of second resilient pieces, each inserted in one of the grooves on one side and extended through the passage; and
a pair of end caps, connected to the first resilient pieces for holding the wiper strip and the pair of second resilient pieces.

2. The soft wiper as claimed in claim 1, wherein each of the first resilient pieces has distal ends formed with a barb shaped portion to secure the end caps.

3. The soft wiper as claimed in claim 1, wherein the first resilient pieces comprise a pair of metal strips formed with a curve.

4. The soft wiper as claimed in claim 1, wherein the first resilient pieces comprise a pair of metal strips made of shape memory alloy and formed with a curve.

5. The soft wiper as claimed in claim 1, wherein the second resilient pieces comprise a pair of metal strips made of shape memory alloy and formed with a curve.

6. The soft wiper as claimed in claim 1, wherein the second resilient pieces comprise a pair of metal strips made of shape memory alloy.

7. The soft wiper as claimed in claim 1, wherein a curvature of the second resilient pieces is formed larger than that of the first resilient pieces.

8. The soft wiper as claimed in claim 1, wherein a lower portion of the pivotal connector provides a protruded claw portion to hold the first resilient pieces.

9. The soft wiper as claimed in claim 1, wherein each of the protecting covers is formed with a ramp for guiding an air flow passing therethrough.

10. The soft wiper as claimed in claim 1, wherein the plurality of grooves includes at least a first groove for inserting one of the first resilient pieces and a second groove for inserting one of the second resilient pieces.

* * * * *